United States Patent
Günther et al.

(10) Patent No.: US 7,551,084 B2
(45) Date of Patent: Jun. 23, 2009

(54) SYSTEM AND METHOD FOR IDENTIFYING AUTOMATION COMPONENTS

(75) Inventors: Harald Günther, Feucht (DE); Dieter Munz, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 191 days.

(21) Appl. No.: 11/346,857

(22) Filed: Feb. 1, 2006

(65) Prior Publication Data

US 2006/0125607 A1 Jun. 15, 2006

Related U.S. Application Data

(63) Continuation-in-part of application No. PCT/EP2004/007587, filed on Jul. 9, 2004.

(30) Foreign Application Priority Data

Aug. 1, 2003 (DE) ................. 103 35 035

(51) Int. Cl.
*G08B 13/14* (2006.01)
(52) U.S. Cl. ................. 340/572.1; 340/10.1; 340/10.34; 340/505; 700/215
(58) Field of Classification Search ... 340/572.1–572.9, 340/10.34, 10.1, 10.52, 5.62, 505, 506; 700/215, 700/221, 222, 224, 227, 229; 384/448
See application file for complete search history.

(56) References Cited

U.S. PATENT DOCUMENTS

| | | | |
|---|---|---|---|
| 5,430,441 A | | 7/1995 | Bickley et al. |
| 5,745,049 A | * | 4/1998 | Akiyama et al. ....... 340/870.17 |
| 5,910,776 A | * | 6/1999 | Black .................. 340/10.1 |
| 6,046,676 A | * | 4/2000 | Ward et al. ............ 340/572.1 |
| 6,225,898 B1 | * | 5/2001 | Kamiya et al. ............ 340/505 |
| 6,249,227 B1 | * | 6/2001 | Brady et al. ............. 340/572.1 |
| 6,288,645 B1 | * | 9/2001 | McCall et al. ........... 340/568.2 |
| 6,476,708 B1 | * | 11/2002 | Johnson ................. 340/10.34 |
| 6,847,856 B1 | * | 1/2005 | Bohannon ................. 700/115 |
| 7,266,518 B2 | * | 9/2007 | Klim et al. .............. 705/28 |
| 7,286,888 B2 | * | 10/2007 | Monette et al. .......... 700/95 |
| 2002/0004767 A1 | * | 1/2002 | Okamoto et al. .......... 705/28 |
| 2002/0120651 A1 | | 8/2002 | Pustejovsky et al. |

(Continued)

FOREIGN PATENT DOCUMENTS

WO WO 03/017015 A1 2/2003

OTHER PUBLICATIONS

"Informationsfluee Durch Produktidentifikation", Werkstatt und Betrieb, Carl Hanser Verlag., vol. 124, No. 12, Dec. 1991, pp. 959-960, XP000252517.

*Primary Examiner*—George A Bugg
*Assistant Examiner*—Hoi C Lau

(57) ABSTRACT

The invention relates to a system and a method for identifying automation components, particularly sensors, actuators and wiring components. According to the invention, each component (sensor, actuator, cable, compensation box, etc.) that is to be identified is equipped with an identification unit in which a code for identifying the automation component is stored and which outputs said identification code when being activated. Preferably, the identification unit comprises an electronic circuit (e.g. an RFID chip or a discreet circuit) while being provided with galvanically insulating (inductive, capacitive, radio-based) or galvanically conducting coupling to the component that is to be identified. The identification unit can be subsequently mounted on a component or can be inseparably connected thereto already during the production of the component.

16 Claims, 5 Drawing Sheets

U.S. PATENT DOCUMENTS

| | | |
|---|---|---|
| 2003/0158795 A1* | 8/2003 | Markham et al. .............. 705/28 |
| 2005/0015169 A1* | 1/2005 | Littlejohn et al. ........... 700/108 |
| 2006/0207089 A1* | 9/2006 | Maenishi et al. .............. 29/832 |
| 2008/0133047 A1* | 6/2008 | Best et al. ................... 700/215 |
| 2008/0262642 A1* | 10/2008 | Maenishi et al. .............. 700/99 |

* cited by examiner

SYSTEM AND METHOD FOR IDENTIFYING AUTOMATION COMPONENTS

CROSS REFERENCE TO RELATED APPLICATIONS

This application is a continuation-in-part application of the International Application No. PCT/EP2004/007587, filed Jul. 9, 2004 and claims the benefit there of. This application further claims the benefit of German Application No. 10335035.7, filed Aug. 1, 2003 the priority of which has been claimed by the above-mentioned International Application No. No. PCT/EP2004/007587. Each of the above-referenced applications are incorporated by reference herein by their entirety.

FIELD OF INVENTION

The invention relates to a system for identifying automation components, in particular sensors, actuators and line components of an automation system. The invention also relates to a method for identifying automation components, an identification unit and a read unit for a system for identifying automation components.

BACKGROUND OF INVENTION

The invention is deployed in particular in the field of automation technology. Automated production and manufacturing equipment primarily comprises the equipment elements to be automated (production and manufacturing units), the automation system and connecting elements between the equipment and the automation system (sensors, actuators and the line components required for their connection). Passive, non-intelligent sensors and non-intelligent actuators are frequently used to acquire and influence process variables (temperature, pressure, valve position). These include sensors (thermal elements, thermal resistors, pressure sensors, resistance-type sensors, position sensors, etc.), actuators (valves, relays, motors, etc.) and line components (thermal lines, equalizing lines, compensation boxes, etc.).

A method for identifying modules or units comprising at least two individual components is known from WO 03/017015. During the production and assembly of the individual components characteristic data relating to the individual components, e.g. their origin, characteristic values or data characterizing the manufacture of the individual components is stored in any data storage unit. During assembly of the individual components to produce the module or unit, data characterizing the module or unit, e.g. its characteristic values, operational and/or functional data of the module or unit, etc. is captured. The data characterizing the individual components is read from the data storage unit and transferred with the data characterizing the module or unit into a readable and programmable data storage unit, which is disposed on the module or unit.

SUMMARY OF INVENTION

An object of the invention is to specify a system for identifying automation components, which allows the identity of the respectively connected components to be determined in a simple and economical manner. The system should also be suitable for adding in stages later.

This object is achieved by the claims.

The invention is based on the knowledge that when installing new equipment and also when maintaining existing equipment there is a latent risk that the wrong components will be connected and not identified. This can have a significantly adverse effect on the quality of the production process and the products themselves and can ultimately lead to production losses. Considerable effort is required in such instances to locate and eliminate the cause of the problem. With the claimed system however every automation component to be identified is provided with an identification unit. The task of the identification unit is to output an identification code on activation, said identification code allowing unique identification of the associated component. The identification unit can thereby be mounted on a component later or can be connected inseparably to a component or integrated in a component during production of said component. The identification code is read with the aid of the read unit, which is for example disposed in or connected to the peripheral modules of the automation system or an operating unit of the automation system. This allows the automation system to identify the respectively connected components independently and thereby verify and monitor the correctness of the equipment.

The identification unit and the read unit can communicate in a simple manner using existing transmission paths in that the read unit is provided for connection to a peripheral module and/or an operating device of the automation system.

Automatic or user-controlled inspection or control of the respectively present automation components is ensured in that the read unit is provided to activate the identification units and/or to scan the identification codes of the connected automation components.

Independent operating safety of the identification units can be achieved in that the read unit is provided to inject the energy required to supply the identifications units into the peripheral channel.

Essential basic elements of the identification unit are that the identification unit is made up of an electronic circuit and a connection to the automation component to be identified.

Advantageous embodiments of the identification units for new and existing systems are achieved in that the identification unit is configured as a separate unit for subsequent mounting on an automation component or as a unit connected inseparably to the automation component.

Automatic activation of the identification units is enabled in that the system has means for activating the identification unit(s) in the manner that when energy is injected into a peripheral channel, the identification unit automatically outputs its identification code when an adequate energy level is reached.

Specific automation components can be addressed in a selective manner according to pre-definable criteria in that the system has means for activating the identification unit(s) in the manner that selective addressing of a pre-definable component class causes the identification unit assigned to the pre-definable component class to output its identification code.

BRIEF DESCRIPTION OF THE DRAWINGS

The invention is described and explained in more detail below based on the exemplary embodiments shown in the figures, in which.

DETAILED DESCRIPTION OF INVENTION

Figure 1:
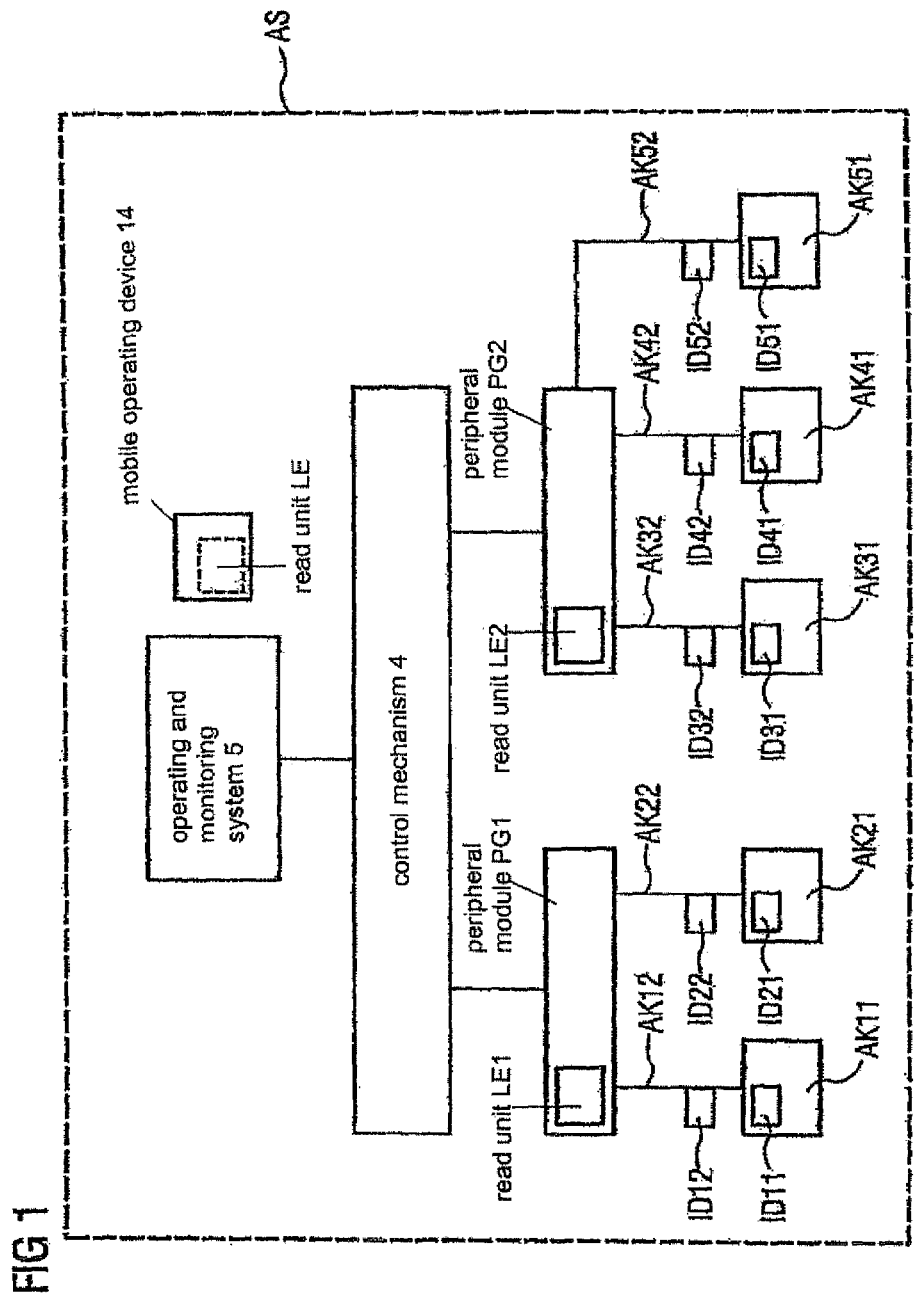
FIG. 1 shows a block circuit diagram of the basic principles of an automation system with a system for identifying automation components.

FIG. 1 shows the basic principles of an automation system AS. The automation system AS comprises automation components AK11 . . . AK52, for example sensors, actuators and other line components. The automation components AK11 . . . AK52 are connected respectively to peripheral devices PG1, PG2, while the peripheral devices PG1, PG2 are in turn connected to a control mechanism 4. An operating and monitoring system 5, which is connected to the controller 4, serves as the user interface. Identification units ID11 . . . ID52 are assigned respectively to the automation components AK11 . . . AK52. The term "automation component" here is so comprehensive that it includes sensors and actuators as well as connection and line components, including cables, etc. The identification units ID11 . . . ID52 each have a storage unit, in which an identification code uniquely identifying the automation components AK11 . . . AK52 is stored. Each automation component AK11 . . . AK52 is thereby characterized by a unique identification code assigned specifically to it. The identification units ID11 . . . ID52 can be activated via read units LE, LE1, LE2, which are disposed in the peripheral devices PG1, PG2 and/or in a mobile operating device 14.

The particular feature of the automation system AS shown in FIG. 1 is that every connected automation component AK11 . . . AK52, for example a sensor, an actuator, a cable, etc., is equipped with an identification unit ID11 . . . ID52. The identification units ID11 . . . ID52 comprise an electronic circuit (e.g. an RFID chip or discrete circuit) and a metallically isolating (inductive, capacitive, radio-based) or metallically conducting connection to the component AK11 . . . AK52 to be identified. The task of the identification unit ID11 . . . ID52 is to output the identification code IC stored in it on activation (see also FIG. 3). This identification code allows unique identification of the associated component AK. The identification unit ID11 . . . ID52 can be mounted on the automation component subsequently or it can be connected inseparably to the component during production of said component. The identification unit ID11 . . . ID52 can be configured as active but is generally configured as passive. In this instance it does not have its own energy supply so it is maintenance-free and is only supplied with energy by the peripheral module PG1, PG2 via existing lines if required. The peripheral modules PG1, PG2 of the automation system and/or the mobile operating and monitoring system 14 is/are equipped with a read unit LE, LE1, LE2 for this purpose. The read units LE1, LE2 of the peripheral modules PG1, PG2 can be connected selectively to the individual peripheral channels of the peripheral modules PG1, PG2 via a metallically isolating (inductive, capacitive, radio-based) or metallically conducting connection. The task of the read units LE, LE1, LE2 is essentially to inject the energy required to supply the identification units into the respective peripheral channel, thereby activating the identification units ID11 . . . ID52 of the connected components AK11 . . . AK52 respectively and thus scanning the identification codes of the connected components AK11 . . . AK52.

Energy and data are thereby transmitted in a channel-selective manner, if only one channel is supplied with energy in each instance. Energy and data are thereby transmitted in a largely line-based manner via existing sensor/actuator cabling. It is only possible to use metallically isolating methods (capacitive, inductive, radio-based) in addition to metallically conducting methods locally in close range of the connections, to avoid influencing the measurement and manipulated variables. It is therefore possible with the aid of the automation system AS shown in FIG. 1 to identify unique components that could not hitherto be identified. This is a basic prerequisite for new system characteristics with significant customer benefits. The system and method shown are comprehensive and suitable for all components that can be connected. No additional lines are required to identify the components. Depending on customers' requirements, automation component identification can also be introduced in stages or added later. Channel-selective and line-based energy and data transmission also results automatically in assignment of the components AL11 . . . AK52 to the peripheral channels as well as unique identification.

Figure 2:
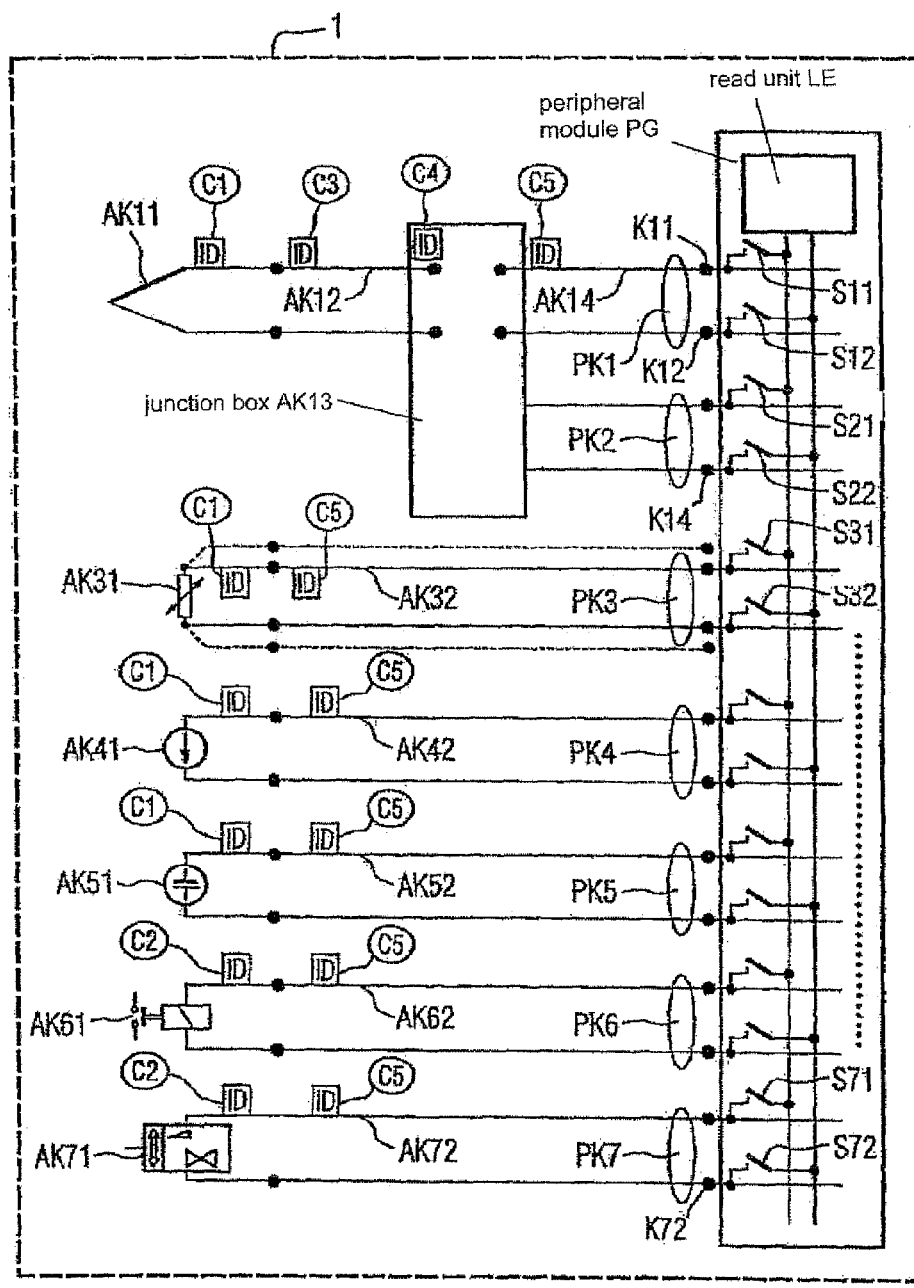
FIG. 2 shows an exemplary embodiment of a system for identifying automation components.

FIG. 2 shows an exemplary embodiment of an identification system 1 for identifying automation components AK11 . . . AK71. Only the elements that are necessary in the context of the identification system are shown. The identification system 1 essentially comprises a read unit LE, which can be connected via switches S11 . . . S72 respectively to peripheral channels PK1 . . . PK7. The read unit LE is for example part of a peripheral module PG, as already described in relation to FIG. 1. Automation components AK11 . . . K72 respectively are connected to the terminals K11 . . . K72 of the peripheral channels PK1 . . . PK7. The automation component AK11 is for example a temperature sensor, which is connected via a data line AK12, a component junction box AK13 and a further connecting line AK14 to the terminals K11, K12 of the peripheral channel PK1 of the peripheral module PG. The terminals K13 . . . K14 are also connected to the component junction box AK13 or can be connected to the read unit. The automation component AK31 is a resistance measuring component operating as a sensor, which is connected via a data line AK32 to the peripheral channel PK3 of the peripheral module PG or which can be connected to the read unit LE via the read switches S31, S32.

Further examples shown in FIG. 2 are a current measuring component AK41, a voltage measuring component AK51, an actuator AK61 configured as a relay and a valve AK71 as a further automation component. Identification units ID are assigned respectively to the automation components AK11 . . . AK72 of the identification system 1 shown in FIG. 2. It should be noted here that the term automation component AK is used in the exemplary embodiment shown in FIG. 2 both for the sensors AK11, AK31, AK41, AK51, as well as for the actuators AK61, AK71 and the line components AK12, AK13, AK14, etc.

A further particular feature of the identification system 1 shown in FIG. 2 is that component-specific information is stored respectively in the identification codes stored in the automation components AK11 . . . AK72 or in the identification units ID11 . . . ID72. This component-specific information for example includes a hierarchical component breakdown into component classes C1 for sensors, C2 for actuators, C3 for thermal cables, C4 for accessories and C5 for cables. The identification code stored in the identification units ID can also contain further classifications, such as nature of component, e.g. by class: sensor, thermal element/thermal resistance, etc., type, manufacturer and optionally further information fields or even configuration in the form of an electronic data sheet. The coding of the information in the identification code can in principle be selected freely but for wide market coverage it can also be based on existing standards, e.g. the electronic product codes. The identification units ID can be activated in two ways:

Simply by applying the energy supply, in Which instance the identification unit ID outputs its identification code automatically when an adequate supply level is reached. This generally requires so-called multitag capability on the part of the read unit. A further option is selective addressing of the automation components AK . . . , e.g. by scanning the respective component class, e.g. the component class C1 for sensors. In this instance the identification unit ID only outputs its identification code, if it satisfies the corresponding scan criterion of the corresponding component class, i.e. it belongs to the component class sensor C1. This means that it is possible to identify a number of components on a peripheral channel or selectively scan detailed information relating to a component even without complex multitag capability.

The identification system 1 can for example carry out an identification process automatically for the connected sensors, actuators, lines and accessories for every peripheral module when equipment is switched on or started up. The following procedure is essentially followed for each individual peripheral channel for this purpose:

connection of the read unit to the peripheral channel,
injection of energy into the peripheral channel,
activation of the identification units, scanning of the identification codes,
termination of the energy injection,
separation of the read unit from the peripheral channel.

This procedure is followed sequentially for each of the existing peripheral channels of a peripheral module. After the end of the identification process the external circuit of a peripheral channel can be uniquely reconstructed based on the identification codes and then used for plausibility checks, conformity checks in respect of the planned equipment configuration, auto-configuration, sensor adaptation, etc. If the read unit is integrated in a mobile operating device for example, the method can also be used during installation and on-site maintenance for circuit identification for an individual peripheral channel.

Figure 3:
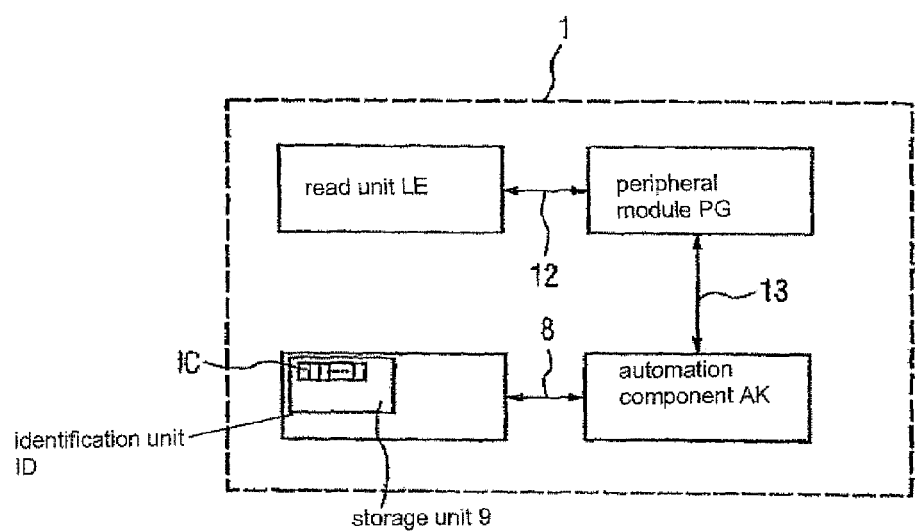
FIG. 3 and FIG. 5 show the basic principles of the interaction of an identification unit and a read unit of a system for identifying automation components.
Figure 5:
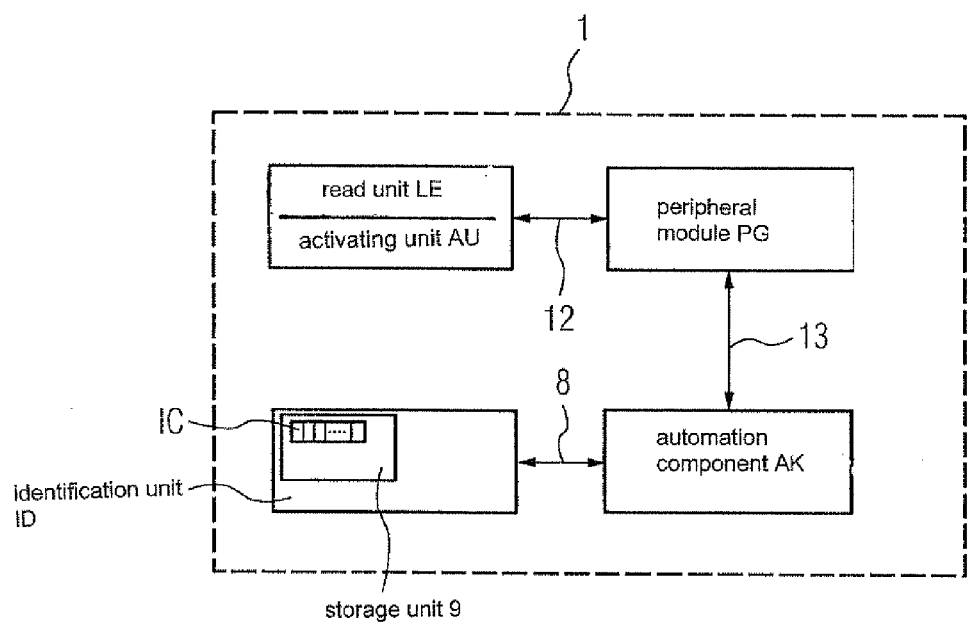

FIG. 3 and FIG. 5 shows the basic principles of the interaction of an identification unit ID and a read unit LE of a system 1 for identifying automation components. A peripheral module PG is again shown in a simplified manner in FIG. 3, said peripheral module PG communicating with an automation component AK. A read unit LE is assigned to the peripheral module PG via a communication interface 12, while an identification unit ID is assigned to the automation component AK via a further communication interface 8. The identification unit ID has a storage unit 9 for storing an identification code IC for the automation component AK. As far as the mode of operation of the identification system 1 is concerned, to avoid repetition see the statements already made relating to FIGS. 1 and 2. In comparison to FIG. 3 FIG. 5 shows in addition a conjunction of a read unit LE and a activating unit AU such that the read unit is provided to activate the identification units.

Figure 4:
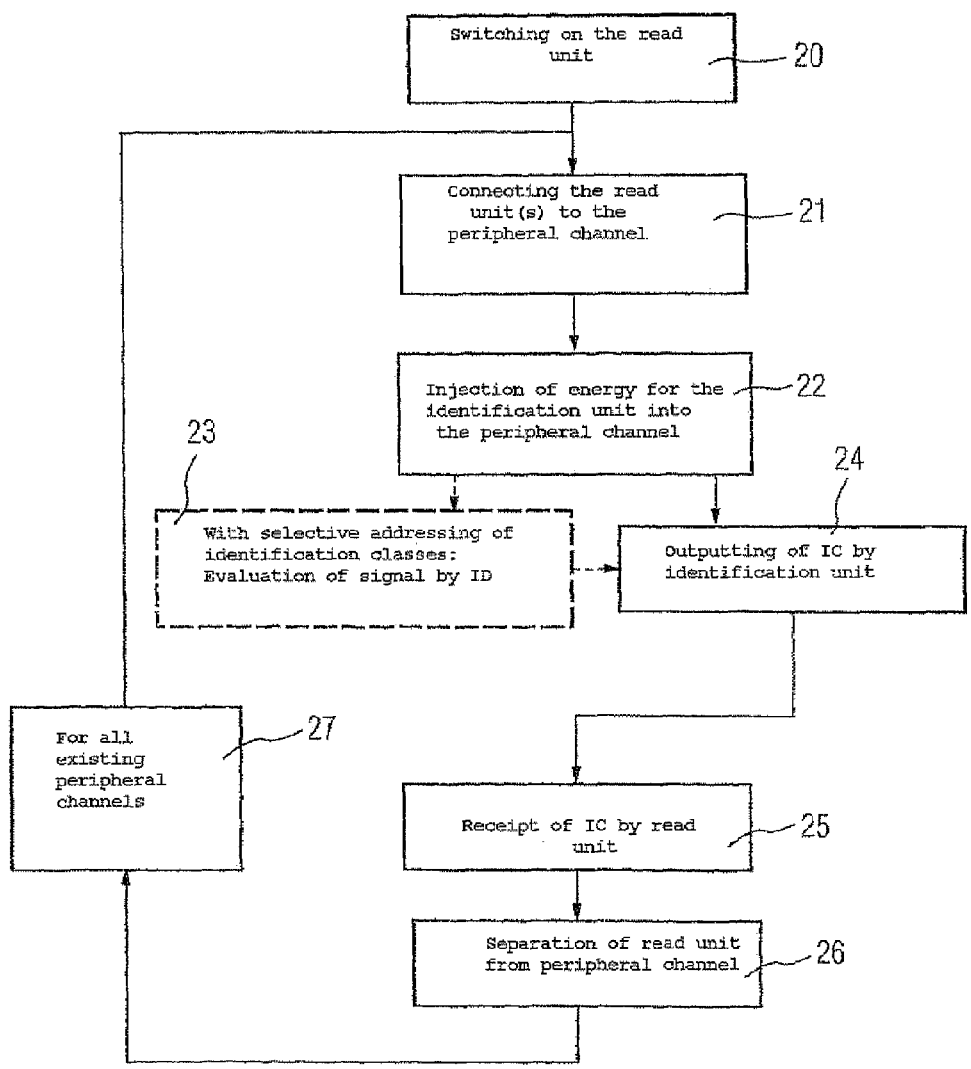
FIG. 4 shows a process sequence for identifying automation components.

FIG. 4 shows an exemplary process sequence for identifying automation components, as can be used for example in conjunction with the identification systems in FIGS. 1 to 3. The procedure starts with the switching on of the read unit in step 20. The next process step is the connection of the read unit to a peripheral channel n in process step 21. In process step 22 energy is injected into the peripheral channel. As described in relation to FIG. 2, in process step 23 the selective addressing of pre-definable identification classes and/or other identification features can also optionally take place. In the next process step 24 the identification units are activated, i.e. the identification unit outputs the identification code. In the next process step 25 the read unit receives the identification code, for example via the already existing data connection to the peripheral channel or the mobile operating device. In process step 26 the read unit is separated from the peripheral channel. The block 27 is used to visualize the fact that the procedure shown in FIG. 4 can be followed for all existing peripheral channels.

To summarize, the invention therefore relates to a system and a method for identifying passive automation components, in particular sensors, actuators and line components. To this end every component to be identified (sensor, actuator, cable, compensation box, etc.) is equipped with an identification unit, in which an identification code for identifying the automation component is stored and which outputs or reads said code on activation. The identification unit preferably comprises an electronic circuit (e.g. RFID chip or discrete circuit) and a metallically isolating (inductive, capacitive, radio-based) or metallically conducting connection to the component to be identified. The identification unit can be mounted on a component later or can be connected inseparably to a component during the production of said component.

The invention claimed is:

1. An identification system for determining identities among a plurality of automation components connected in a manufacturing system, the components including production and manufacturing units in an automation system, the identification system comprising:

an identification unit assigned to each in the plurality of automation components while connected for operation in the manufacturing system;

an identification code stored in the identification unit for identifying the respective automation component;

a read unit for reading the identification code from each identification unit and thereby (i) determine the identity of the automation component to which the identification unit is assigned and (ii) verify and monitor whether correct ones of the automation components are installed to prevent or eliminate problems resulting from connection of wrong components; and an activating unit for activating the identification units, the activating unit configured to address a pre-definable component class so that such identification unit corresponding to the pre-definable component class is caused to output its respective identification code, wherein at least one component class is selected from the group consisting of a class for sensors, a class for actuators, a class for thermal cables, a class for accessories, a class for thermal elements and a class for thermal resistance.

2. The system according to claim 1, wherein the automation components are sensors, actuators or line components.

3. The system according to claim 1, wherein the read unit is configured to be connected to a peripheral module or an operating device of the automation system.

4. The system according to claim 1, wherein the read unit operates in conjunction with the activating unit and is configured to activate the identification units in an addressed component class or to scan the output identification code of each automation component in an addressed component class.

5. The system according to claim 1, wherein the read unit is configured to inject into a peripheral channel the energy required to supply the identification units.

6. The system according to claim 1, wherein the identification unit includes an electronic circuit and a coupling unit providing connection to the respective automation component.

7. The system according to claim 1, wherein the identification unit is embodied as a separate unit configured for subsequent mounting on an automation component or as a unit permanently connected to the respective automation component.

8. The system according to claim 1, wherein the activating unit is configured to activate the identification units such that providing energy supply to the respective identification unit causes the respective identification unit to output its respective identification code automatically as soon as a specified energy supply level is present at the respective identification unit.

9. An identification subsystem, operable within an automated manufacturing system, for determining identities among a plurality of automation components connected in the manufacturing system, the components including production and manufacturing units, the identification subsystem comprising:

a plurality of addressable identification units each assignable to a different one of the automation components, the identification units each including an identification code stored therein for determining identity of the automation component to which it is assigned;

a transmit unit for transmitting the identification code from the identification unit to a read unit;

a read unit for reading the identification code from each identification unit and thereby (i) determine the identity of the automation component to which the identification unit is assigned and (ii) monitor and verify whether correct ones of the automation components are installed, this enabling the subsystem to prevent or eliminate problems resulting from incorrect connection of components in the manufacturing system; and an activating device for activating the transmit unit to output the identification code stored in the at least one identification unit to identify the first automation component when a pre-definable component class corresponding to the identification unit is addressed, wherein at least one component class is selected from the group consisting of a class for sensors, a class for actuators, a class for thermal cables, a class for accessories, a class for thermal elements and a class for thermal resistance.

10. The identification unit according to claim 9, wherein the transmit unit is configured to output the identification code automatically as soon as a specified energy supply level is present at the identification unit.

11. A read subsystem, operable within a system, for identifying automation components each having a predefined connection for operation in a manufacturing system, wherein the components are deployed to effect manufacturing processes and wherein addressable read units are connected to receive data from the automation components, each read unit including a receiver for receiving an identification code output by an identification unit of an automation component, the read subsystem including an activating unit for activating the identification unit, the activating unit configured to address read units according to pre-definable component classes so that an identification unit in a pre-definable component class is caused to output the identification code, wherein at least one component class is selected from the group consisting of a class for sensors, a class for actuators, a class for thermal cables, a class for accessories, a class for thermal elements and a class for thermal resistance, the subsystem providing determination of (i) an automation component identity to which the identification unit is assigned and (ii) whether correct ones of the automation components are installed according to the predefined connections, this enabling the subsystem to prevent or eliminate problems resulting from incorrect connection of components in the manufacturing system.

12. The read unit according to claim 11, wherein the read unit is configured to inject into a peripheral channel the energy required to supply the identification unit.

13. The read unit according to claim 11, wherein the read unit is configured to activate the identification unit such that providing an energy supply to the identification unit causes the identification unit to output its identification code automatically as soon as a specified energy supply level is present at the identification unit.

14. A method for identifying automation components in a manufacturing system, wherein the components are deployed according to predefined connections to effect manufacturing processes, the method comprising:

assigning an addressable identification unit to each automation component;

storing an identification code for identifying the respective automation component in a storage unit of the identification unit;

reading the identification code under program control or user control from the identification unit;

activating the identification unit by selectively addressing a pre-definable component class to cause the identification unit corresponding to the pre-definable component class to output the identification code;

injecting the energy required to supply the identification unit into a peripheral channel, by a read unit; and executing an identification process regarding the automation components by a peripheral module upon switching on the automation system, wherein the automation system includes at least one peripheral channel, the identification process comprising:

connecting the read unit to the peripheral channel;

injecting the energy into the peripheral channel by the read unit;

activating the identification unit;

scanning the identification code;

terminating the injection of the energy; and separating the read unit from the peripheral channel, the identification process determining (i) the identity of the automation component to which the identification unit is assigned and (ii) whether correct ones of the automation components are installed in accord with the predefined connections, this enabling the subsystem to prevent or eliminate problems resulting from incorrect connection of components in the manufacturing system.

15. The method according to claim 14, wherein activating the identification unit includes applying an energy supply to the identification unit and automatically outputting the identification code as soon as a specified energy supply level is present at the identification unit.

16. The method according to claim 14, wherein the automation system includes a plurality of peripheral channels, and the identification process is executed sequentially for each peripheral channel.

* * * * *